S. W. DUDLEY.
FLUID PRESSURE BRAKE DEVICE.
APPLICATION FILED MAY 21, 1919.
1,400,670. Patented Dec. 20, 1921.
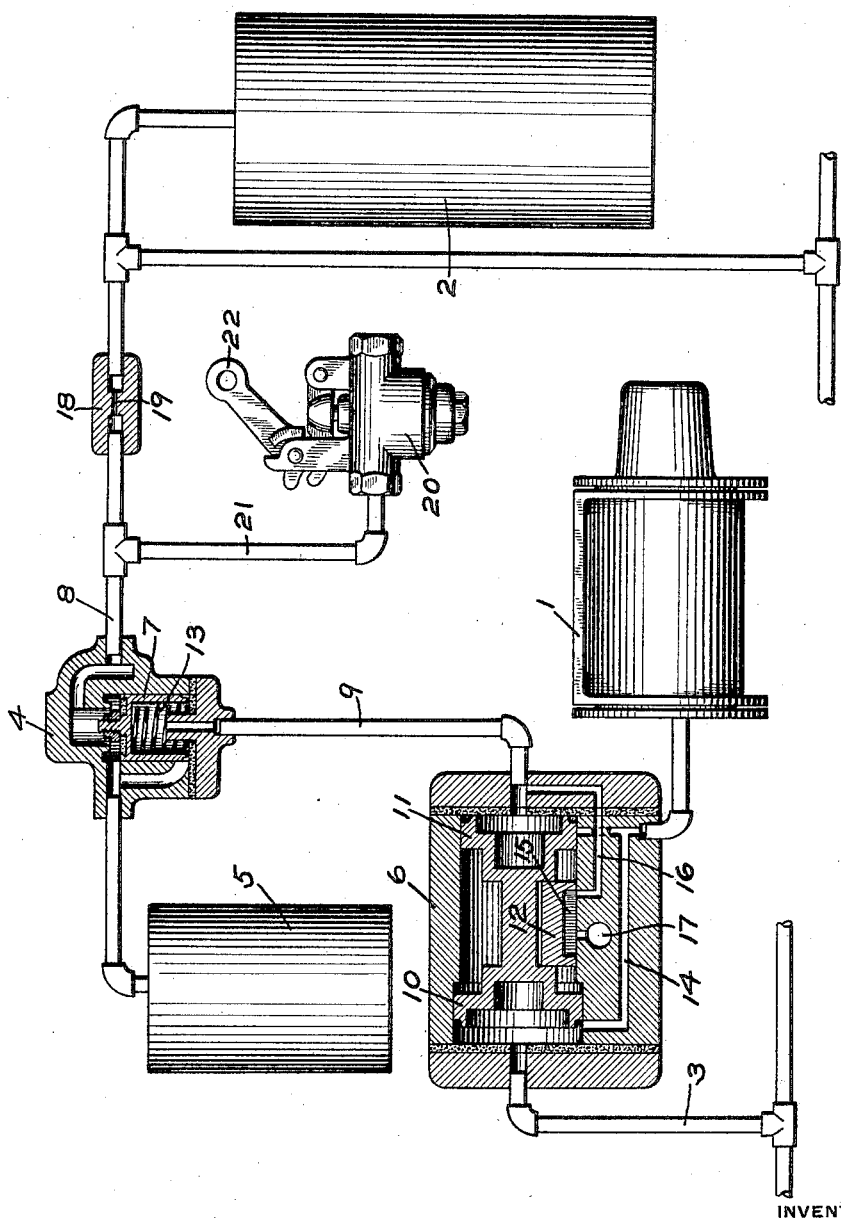
INVENTOR
Samuel W. Dudley
by Wm. M. Cady
Att'y.

UNITED STATES PATENT OFFICE.

SAMUEL W. DUDLEY, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE-BRAKE DEVICE.

1,400,670.  Specification of Letters Patent.  Patented Dec. 20, 1921.

Application filed May 21, 1919. Serial No. 298,664.

*To all whom it may concern:*

Be it known that I, SAMUEL W. DUDLEY, a citizen of the United States, residing at Edgewood, in the county of Allegheny and State of Pennsylvania, have invented new and useful Improvements in Fluid-Pressure-Brake Devices, of which the following is a specification.

This invention relates to fluid pressure brakes, and more particularly to a straight air brake.

In a straight air or direct acting brake, a brake valve is provided for supplying fluid from the main reservoir to the brake cylinder to effect an application of the brakes, the brake valve also having a position in which fluid is released from the brake cylinder.

With a direct acting brake of the above character if the main reservoir pressure becomes reduced by excessive leakage, then the operator will be unable to apply the brakes, and furthermore, he may not be aware of the loss of main reservoir pressure until he attempts to apply the brakes.

The principal object of my invention is to provide means in connection with a straight air brake system for automatically effecting an application of the brakes in case the main reservoir pressure should fall below a predetermined degree.

In the accompanying drawing, the single figure is a diagrammatic view of a straight air brake system with my improvement applied thereto.

As shown in the drawing, the apparatus on the car may comprise a brake cylinder 1, a main reservoir 2, a straight air pipe 3, and according to my invention, a valve device 4, an additional reservoir 5, and a double check valve device 6.

The valve device 4 may comprise a casing containing a valve piston 7, subject on one side to main reservoir pressure supplied through pipe 8 and adapted to control communication from the additional reservoir 5 through pipe 9 to brake cylinder 1.

The double check valve device 6 controls communication from the straight air pipe 3 and pipe 9 to the brake cylinder 1 and comprises a casing containing a double headed piston having differential connected piston heads 10 and 11 adapted to operate to slide valve 12.

In operation, upon charging the main reservoir 2 with fluid under pressure, fluid flows from the main reservoir through pipe 8 to the exposed face of the valve piston 7 and when the pressure has been raised to a predetermined degree sufficient to overcome the opposing pressure of the spring 13, the valve piston is shifted from its upper seat, permitting the additional reservoir 5 to be charged with fluid at main reservoir pressure.

The brakes are normally controlled through the straight air pipes 3 and in applying the brakes, fluid supplied by operation of the usual brake valve device to the straight air pipe 3, flows to the piston head 10 of the double check valve device 6 and operates to shift the double check valve to the position shown in the drawing. In this position, passage 14 is uncovered, so that fluid from the straight air pipe 3 flows to the brake cylinder 1. A cavity 15 in slide valve 12 connects pipe 9 through passage 16 with exhaust port 17, so that the spring side of the valve piston 7 is normally maintained at atmospheric pressure.

If the main reservoir pressure should drop below a predetermined degree, the spring 13 will act to shift the valve piston 7 to its upper seat, cutting off communication from the main reservoir pipe 8, and opening communication from the additional reservoir 5 to pipe 9. Fluid from the reservoir 5 then flows to the face of piston 11 of the double check valve device and operates the same to open communication from pipe 9 to the brake cylinder 1. Fluid is thereupon supplied to the brake cylinder to automatically effect an application of the brakes. This movement of the double check valve device also cuts off communication from the brake cylinder to the straight air pipe 3, so that fluid supplied to the brake cylinder will not escape through the straight air pipe.

When the brakes have been automatically applied upon a predetermined reduction in main reservoir pressure, the double check valve may be returned to normal position, so as to permit the release of the brakes, as soon as the main reservoir pressure has been raised to a predetermined degree, by supplying fluid to the straight air pipe 3 through the operation of the usual brake valve. Since the pressure in the brake cylinder 1 at this time is at the reduced degree to which the main reservoir fell in order to cause the automatic operation, the higher pressure to which the main reservoir has been raised, acting on piston head 10, is sufficient to overcome the reduced pressure acting on piston head 11, so that the double check valve device will be shifted back to the normal position, permitting the fluid in the brake cylinder to be released through the straight air pipe and the brake valve, upon turning the brake valve to release position.

The construction above described provides means whereby the brakes may be automatically operated by the conductor and for this purpose a conductor's valve 20 of the well known type heretofore employed in connection with automatic fluid pressure brake systems is provided and said valve is connected by pipe 21 to the pipe 8.

When the handle 22 of the conductor's valve is pulled, fluid is vented from pipe 21 to the atmosphere and this causes a sufficient reduction in pressure on the valve piston 7, so as to cause same to operate and open communication from the reservoir 5 to the brake cylinder 1, as in the case of a predetermined reduction in main reservoir pressure.

A choke 18 having a restricted port 19 may be interposed in the pipe 8, between the main reservoir 2 and the pipe 21, so as to prevent excessive waste of main reservoir pressure, as well as to insure the operation of the valve piston 7, when the conductor's valve 20 is operated to vent fluid from the pipe 8.

It will now be seen that I have provided a straight air or direct acting fluid pressure brake system in which an application of the brakes is automatically produced, in case the pressure of fluid in the source of pressure for the system should fall below a predetermined degree.

Furthermore, a conductor's valve may be manually operated at any time for also causing an application of the brakes, by venting fluid from the pipe through which fluid under pressure from the source of pressure is supplied to the automatically operating valve device 4.

Having now described my invention, what I claim as new, and desire to secure by Letters Patent, is:—

1. In a direct acting brake system, the combination with a brake cylinder, a source of fluid under pressure, and a straight air pipe through which fluid is supplied to the brake cylinder to effect an application of the brakes, of a reservoir normally charged from said source and means operated upon a predetermined reduction in the pressure of said source for supplying fluid from said reservoir to the brake cylinder.

2. In a direct acting brake system, the combination with a brake cylinder, a source of fluid under pressure, and a straight air pipe through which fluid is supplied to the brake cylinder to effect an application of the brakes, of a reservoir adapted to be charged from said source and a valve device operated upon a predetermined reduction in the pressure of said source for supplying fluid from said reservoir to the brake cylinder, and for cutting off communication from said source to said reservoir.

3. The combination with a brake cylinder, a main reservoir, and a straight air pipe through which fluid is supplied from the main reservoir to the brake cylinder, of a valve device operated upon a predetermined reduction in main reservoir pressure for supplying fluid to the brake cylinder and a double check valve device for normally establishing communication from the straight air pipe to the brake cylinder and operated by the flow of air from said valve device to open communication from said valve device to the brake cylinder.

4. In a direct acting brake system, the combination with a brake cylinder, a main reservoir, and a straight air pipe for supplying fluid from the main reservoir to the brake cylinder, of a valve device operated upon a predetermined reduction in main reservoir pressure for supplying fluid to the brake cylinder and a conductor's valve for also venting fluid from said valve device to operate same.

In testimony whereof I have hereunto set my hand.

SAMUEL W. DUDLEY.